US006304257B1

(12) United States Patent
Viskari

(10) Patent No.: US 6,304,257 B1
(45) Date of Patent: Oct. 16, 2001

(54) PROCEDURE AND APPARATUS FOR PRESENTING ELEVATOR FUNCTIONS

(75) Inventor: Juha Viskari, Hyvinkää (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 09/091,478

(22) PCT Filed: Dec. 20, 1996

(86) PCT No.: PCT/FI96/00680

§ 371 Date: Sep. 21, 1998

§ 102(e) Date: Sep. 21, 1998

(87) PCT Pub. No.: WO97/23400

PCT Pub. Date: Jul. 3, 1997

(30) Foreign Application Priority Data

Dec. 21, 1995 (FI) ..................................................... 956199

(51) Int. Cl.[7] ..................................................... G06F 11/00

(52) U.S. Cl. ......................... 345/339; 345/333; 345/965; 187/241

(58) Field of Search .................................... 345/331, 333, 345/334, 337, 339; 187/241, 247, 341, 396

(56) References Cited

U.S. PATENT DOCUMENTS

| | | | | |
|---|---|---|---|---|
| 4,418,795 | | 12/1983 | Trosky et al. . | |
| 4,930,604 | | 6/1990 | Schienda et al. . | |
| 4,936,419 | | 6/1990 | Stadler et al. . | |
| 5,010,472 | * | 4/1991 | Yoneda et al. | 187/121 |
| 5,354,957 | * | 10/1994 | Robertson | 187/247 |
| 5,787,020 | * | 7/1998 | Molliere et al. | 187/390 |
| 5,886,696 | * | 3/1999 | Kakko et al. | 345/341 |

* cited by examiner

*Primary Examiner*—Raymond J. Bayerl
*Assistant Examiner*—Cao H. Nguyen

(57) ABSTRACT

A method and an apparatus for presenting elevator functions on a display in the user interface of the elevator. The functions of the elevator are monitored and changes occurring in the functions are stored in a database. The events and their times of occurrence are read from memory and presented via the display device in the user interface. A playback function is used to display the traffic events and operative events of the elevator. The events can be searched on the basis of event type, time of occurrence or a special sign.

12 Claims, 4 Drawing Sheets

PROCEDURE AND APPARATUS FOR PRESENTING ELEVATOR FUNCTIONS

This application claims the benefit under 35 U.S.C. §371 of prior PCT International Application No. PCT/FI96/00680 which has an International filing date of Dec. 20, 1996 which designated the United States of America, the entire contents of which are hereby incorporated by reference.

BACKGROUND OF THE INVENTION

1. Field of the Invention

The invention relates to a method for monitoring the functions of an elevator, in which method the functions of the elevator are observed continuously and at least changes occurring in the functions are registered and the events and their times of occurrence are stored in a memory associated with the elevator, and in which method the stored information about events and their times of occurrence is read from memory and presented on a display device associated with the elevator. The invention also relates to an apparatus for monitoring the traffic events of an elevator and displaying error conditions.

2. Description of the Related Art

The operation of an elevator consists of a series of chronologically distinct events. Using the elevator's call devices, elevator users give call signals, which are transmitted to the elevator control system. The elevator serves the calls as directed by the control system of the elevator or elevator group and sends control signals to the various regulating units of the elevator, such as the drive motor, door operating equipment and display units. As the elevator receives control commands and performs corresponding functions, the status and operation of the regulating units of the elevator are monitored by measuring their input and output signals. This monitoring is performed to maintain statistical information about the functions of the elevator, and the data collected and stored is utilized in elevator maintenance and in the planning of better elevator drives. The stored sequences of events are also utilized when examining abnormal behavior of the elevator and working out the causes that resulted in such behavior.

In a prior-art solution, traffic events and elevator control commands are stored in a memory comprised in the control unit of the elevator. The control unit is provided with a real-time monitoring display, by means of which the traffic events of the elevator can be monitored. This solution also has a playback function which makes it possible to track down the status of an elevator or elevator group at a given instant and to restore the display image corresponding to that instant. The display corresponding to the status at the instant in question shows e.g. the positions of the elevator cars, the modes and calls of the elevator group and the elevators. The playback function allows subsequent animation of traffic situations. When the relevant instant, e.g. the time of occurrence of a malfunction, is known, the causes of the failure may be inferred from the information relating to that instant and from the traffic history preceding it.

This prior-art solution involves numerous problems that make it difficult to apply in practice to unravel a failure. The monitor display shows only traffic events and the time, which changes in accordance with the recording. A serviceman or other user of the apparatus therefore has to record the times of occurrence of the error events manually for the time of the playback. During playback, the user has to observe a large number of simultaneous traffic events and also to observe and compare the time running on the display with the manually recorded time of occurrence of the malfunction. Several error messages may appear almost simultaneously, so it is difficult to remember them all. Locating a given point in the recording accurately and quickly is difficult and may be frustrating if the search has to be repeated several times e.g. when certain details are to be checked against previous traffic history. There is no easy access to information about corresponding earlier error messages, which could help establish the causes of a failure on the basis of event history. Especially in cases where a failure is associated with certain clearly recognizable foretokens, this information is of great importance for the identification of the fault.

Previously known is also the possibility of viewing error histories. However, this only provides access to exact times of occurrence of errors, and only information relating to error events can be displayed.

The object of the present invention is to provide a method and apparatus to achieve a new solution for monitoring elevator events without the drawbacks mentioned above.

BRIEF SUMMARY OF THE INVENTION

In the solution of the invention, the instants of occurrence of the error events occurring in elevator operation need not be separately kept in memory, because the playback function is able to highlight them so as to distinguish them from the rest of traffic events and because they can be found via direct search based e.g. on failure type, time of occurrence of the error event or a special marking. The number of errors that can be examined and selected at a time is not limited beforehand. The invention allows the entire recorded traffic history, not only a limited portion of it as in the prior-art solution, to be examined via playback at the same time.

A search function allows a systematic search for similar error situations. By using several search criteria, more accurate search results can be achieved and thus the process of unraveling failure situations involving complicated causalities becomes faster and more accurate.

The solution of the invention can be easily adapted to different product assemblies. The technical solutions to be selected are not visible to the user, except for the user interface, so the system is user friendly.

With the playback function, a serviceman or installer can follow the event history of an elevator at a desired rate. Depending on the type of the failure, only significant events are displayed, which means that the perspicuity of the display is improved and the rate of presentation of information can be accelerated accordingly.

BRIEF DESCRIPTION OF THE DRAWINGS

In the following, the invention is described in greater detail by referring to the drawings, in which.

DETAILED DESCRIPTION OF THE INVENTION

Figure 1A:
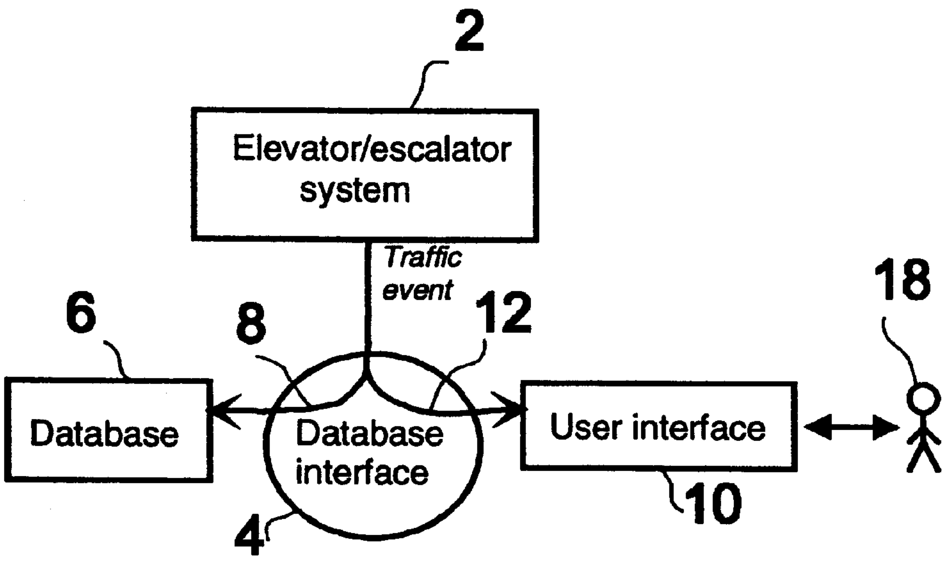
FIGS. 1*a* and 1*b* present diagrams representing real-time monitoring and playback monitoring, respectively, of the traffic events of an elevator.
Figure 1B:
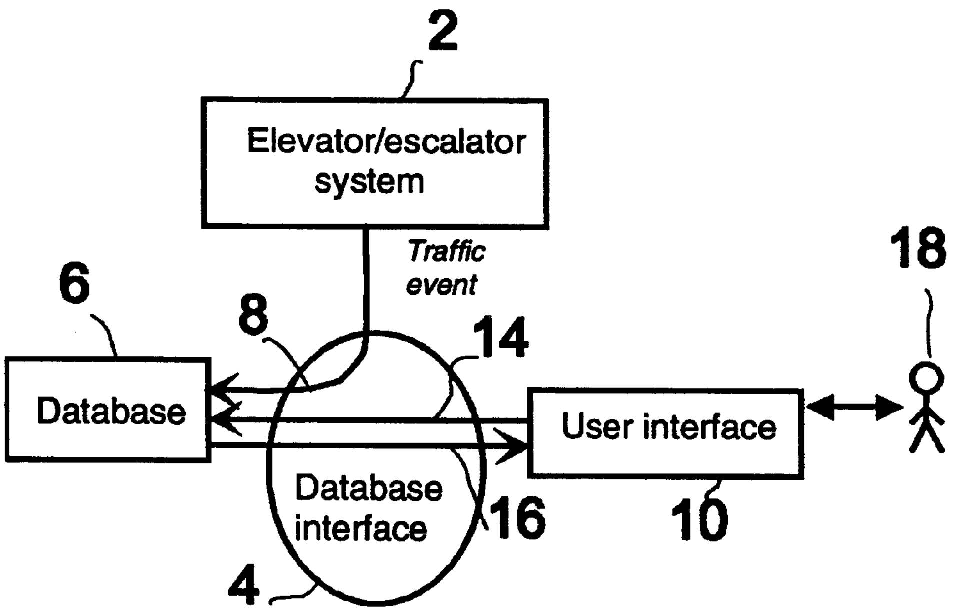

The flow of information relating to the traffic events in an elevator system and in an escalator system in a solution as provided by the invention is presented in diagrammatic form in FIGS. 1*a* and 1*b*, respectively. In the following, events and corresponding displays are only described in reference to an elevator system, but events in an escalator system can also be described in a corresponding manner as far as applicable. In real-time monitoring (FIG. 1*a*), serial signals representing traffic events in an elevator system 2 are passed to a database 6 via a database interface 4 (arrow 8). At the same time, the signals are also directed to a user interface 10 (arrow 12) to allow the information to be presented to the user 18 in real time via a display screen. The traffic events of the elevator system are obtained directly if the elevator control is implemented using the serial communication technique, or via a separate adapter if the elevator is implemented using the relay technique. The database and the database interface are implemented using normal commercially available units based on a PC. In playback monitoring as illustrated by FIG. 1*b*, the data flow 8 relating to traffic events between the elevator system 2 and the database 6 is the same as in FIG. 1*a*, whereas the user interface 10 has a connection to the database 6 to allow playback commands (arrow 14) and recorded events (arrow 16) to be transferred between the user interface 10 and the database 6. The database interface is so routed that, in playback monitoring, the traffic events of the elevator system 2 are stored in the database 6 and at the same time previously stored traffic event data can be transferred to the user interface 10. In other respects, events are monitored in the same way as in FIG. 1*a*.

The functions of the elevator are observed continuously. Any changes in the functions are registered and their times of occurrence are stored in the database, which resides e.g. in the memory of a computer. As defined later on, a distinction is made here between operative events and traffic events.

Figure 2A:
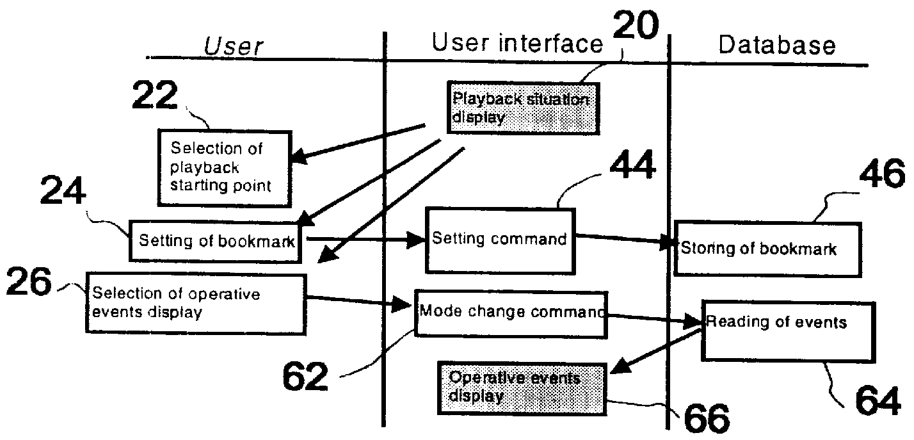
FIGS. 2*a*, 2*b* and 2*c* represent the connections between the user, user interface and database in the basic playback functions, during playback and during operative events, respectively.
Figure 2B:
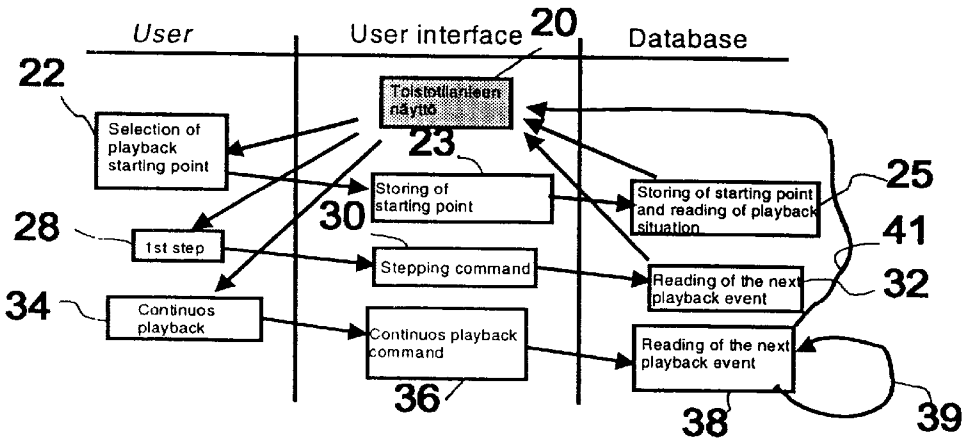
Figure 2C:
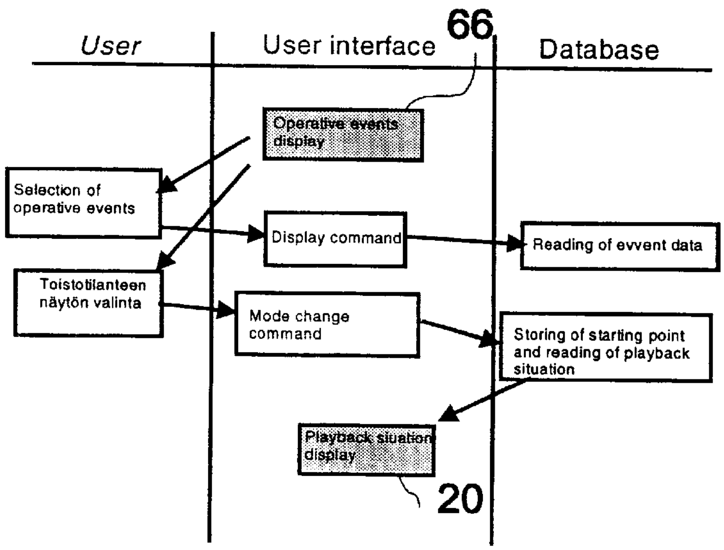
Figure 3A:
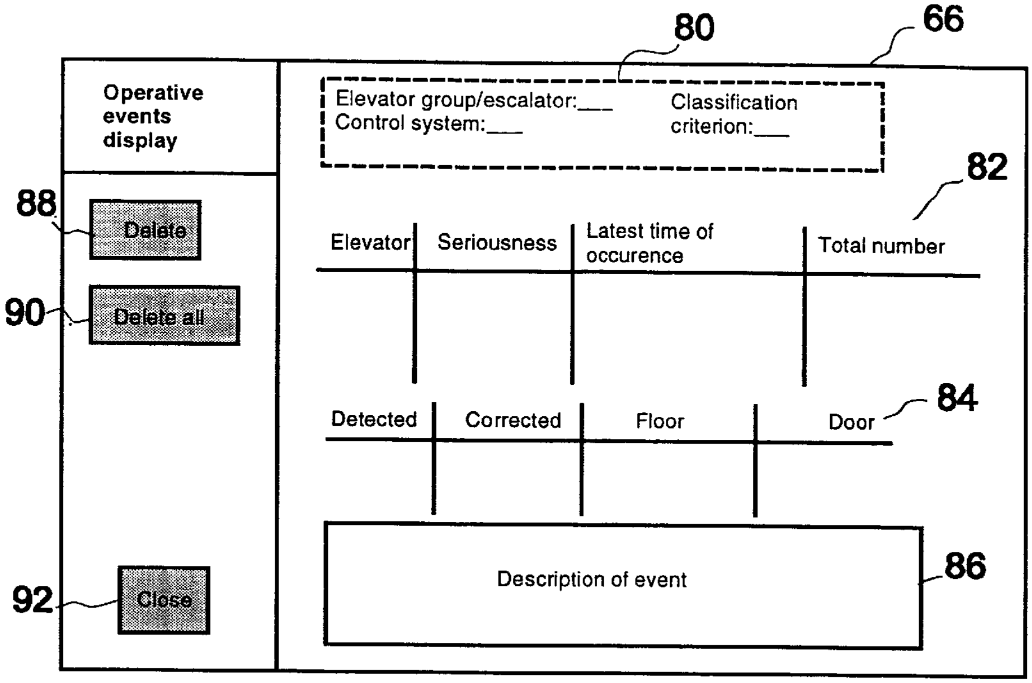
FIGS. 3*a* and 3*b* present the display screen of a display device, relating to operative events and playback, respectively.
Figure 3B:
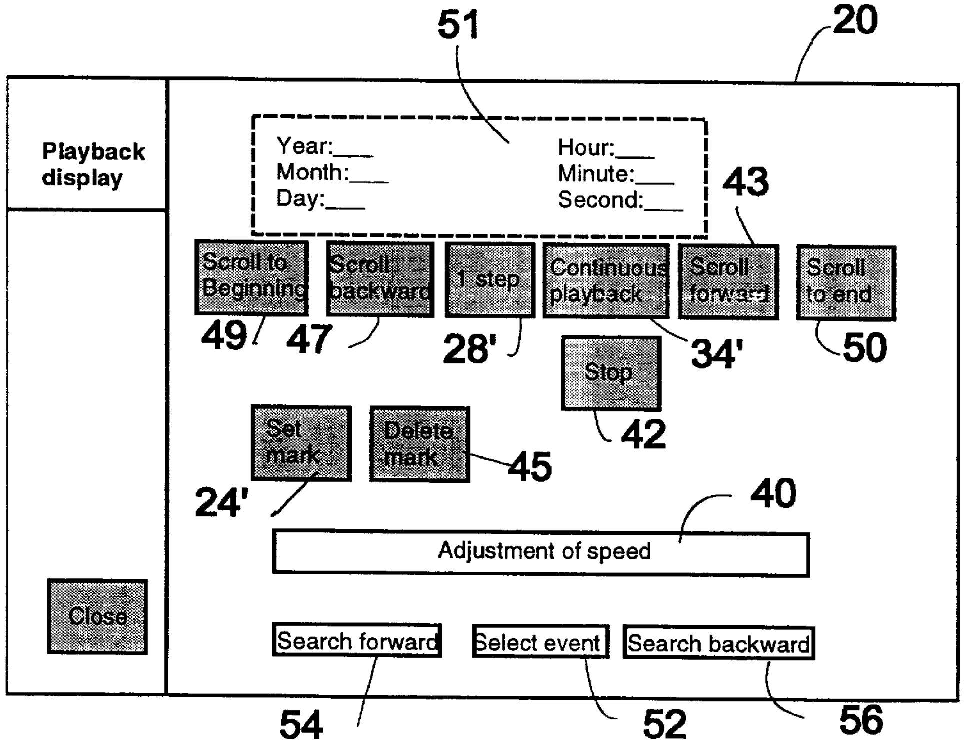

Now, referring to FIGS. 2*a*, 2*b* and 2*c*, let us consider the interaction between the user, user interface and database as well as the transitions of functions between these when the solution of the invention is applied. In different operational modes, the user can select playback and display of operative events. In the basic operational mode (FIG. 2*a*), the user can select from the playback situation display 20 (illustrated in greater detail in FIG. 3*b*) a playback starting point 22, which is the starting event in the playback display, setting of a bookmark 24 and display of operative events 26. The playback starting point or the instant corresponding to the starting event can be entered via a keyboard in the user interface with an accuracy of 1 second by typing the date (year, month, day) and time (hour, minute, second). The selected instant is shown at item 51 on the display (FIG. 3*b*). The starting time can also be selected by using a scrolling function, scrolling either forward 43 or backward 47, or by jumping to the beginning 49 or the end 50 of the stored traffic history. A given type of event or a stored history bookmark can also be retrieved by using an event search function. First, one selects an event type or a bookmark 52. The history can be searched forward 54 or backward 56. Once the user has selected a starting point 22, the user interface transmits the starting point (23, FIG. 2*b*) to the database, whereupon the playback situation 25 for the starting point is read from the event history and displayed by the user interface via the playback situation display 20.

Based on the event, individual events are searched. In a certain embodiment, combinations of events are searched in which the events do not necessarily follow each other in sequence but may be interspersed with irrelevant traffic events.

In the playback of traffic events, it is possible to advance one step at a time 28, selection 28' in FIG. 3*b*, in which case the user interface gives a stepping command 30, which causes the next event to be read 32 from the database, whereupon it is displayed on the user interface playback situation display 20. If the user selects continuous playback 34 (on the playback display 34' in FIG. 3*b*), the user interface issues a continuous playback command 36 and the next playback event is read 38 repeatedly from the database. When continuous playback is active, the next event is read at a speed selected with a speed controller 40, represented by arrow 39. During the continuous function, the user interface is updated accordingly, i.e. the database transmits the data relating to the traffic event to the playback display (arrow 41). Continuos playback can be stopped by means of selector 42.

When a relevant event is encountered, the user sets a bookmark, item 24 (FIG. 2*a*) via selector 24' (FIG. 3*b*), whereupon the user interface gives a setting command 44 (FIG. 2*a*) and a bookmark is stored, item 46, in the database against the traffic event in question. The bookmark may relate to an individual event or to a combination of events. A previously set bookmark is deleted via a menu 45.

On observing an interesting situation in the playback display, such as an error event in a given function, the user proceeds to examine operative events. In this context, operative events include any disturbances appearing in the operation of the elevator, such as alarm, failure or malfunction messages. An alarm message indicates that a passenger may have been trapped in the elevator when the car has stopped between floors. A failure message indicates that the operation of the elevator has been interrupted due to a failure event, but passengers who may have been traveling in the elevator have been able to get out by themselves. In the case of a malfunction message, one of the elevator functions is not being carried out correctly, but the elevator continues operating either immediately or after a short delay. In this case, passengers do not necessarily become aware of any disturbance in the operation of the elevator. In this context, operative functions also include events relating to elevator status. Such events include changes of operational mode (maintenance, elevator out of service, fireman operation, etc.), transitions to another traffic condition (up peak, down peak, prioritized traffic, etc.) as determined by the group control of an elevator group, or a request for an elevator to park at a given floor. Different operative events are preferably displayed using different kinds of highlighting to make them easier to perceive. The user now enters a selection according to item 26, whereupon the user interface issues a mode change command 62 and the data relating to the event is read (item 64) from the database. Next, item 66, the user proceeds via the user interface to the display of operative events as depicted in FIG. 3*a*. Upon encountering an interesting operative function, the user can proceed directly to the playback function, which shows the events of the elevator and traffic situation concerned in the same way as they occurred.

In the display of operative events, display section 80 shows the identifier data for the elevator group and the control system as well as the classification criterion selected. Event identification data are displayed in table 82, which has separate columns for elevator number, degree of seriousness of failure/event, latest time of occurrence and total number of failures. By selecting an event identifier, the event-specific history for the event selected is displayed in table 84, presenting the times of occurrence of the events, dates of correction, floor data and door data. Field 86 shows a brief description of the probable cause of the event, such as "photocell dirty", which has been stored in memory. Menus

88 and 90 can be used to delete selected rows in fields 82 and 84 or to delete all rows, respectively. The display of operative functions is closed via menu 92.

Figure 4:
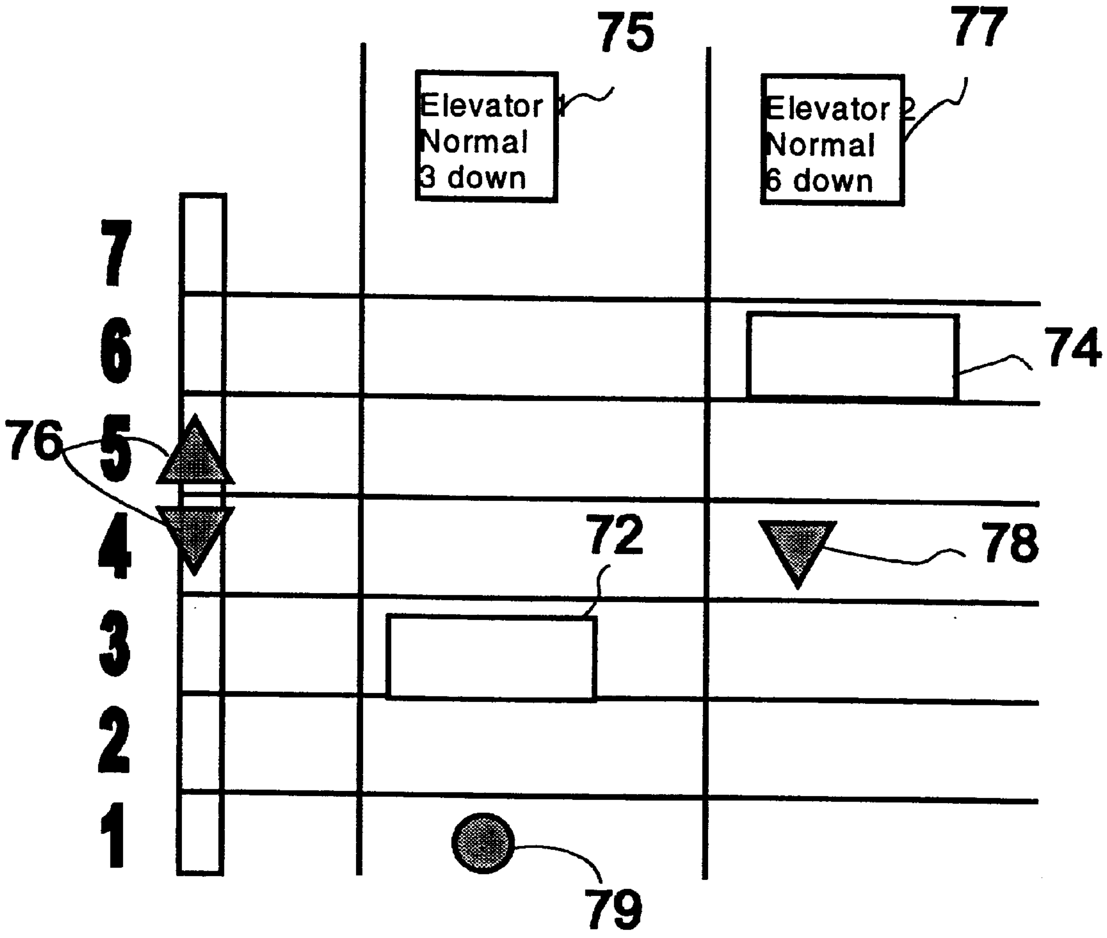
FIG. 4 presents the traffic display of an elevator group in a certain traffic situation.

FIG. 4 presents the traffic display for an elevator group having two elevators. For each elevator, a car 72, 74 is shown. Arrow symbols 76 indicate landing calls in effect, on floors 4 and 5. Above the "elevator shaft" are fields 75, 77 containing elevator identification data, operational mode (normal) and position and direction data. A landing call allocated to elevator 2 is represented by arrow symbol 78 and a car call from elevator 1 by a round symbol 79. The display presents all information describing the traffic situation and elevator behavior, e.g. parking floors, locking settings, operational modes.

The functions described above are preferably implemented as Windows$^{TR}$ based applications. Other graphic implementations can also be used.

When the arrangement of the invention is utilized, a failure condition and the causes behind it can be analyzed and located via a procedure as illustrated by the following example.

Let us suppose we have an elevator group with two fast elevators in the same shaft of a large height. One of the elevators generates an alarm after the car has stopped in the middle of the shaft, with passengers on board. A serviceman arrives, frees the passengers and ascertains that the fault is only a break in the safety circuit. He then goes and uses the playback function of the traffic monitor to find out the exact cause that led to the failure event.

The serviceman sets "alarms in chronological order" as a search criterion and obtains a display showing the alarm caused by the break in the safety circuit as well as the two elevators side by side at the same floor. Continuous playback indicates that both elevators were traveling in the same direction at full speed. The serviceman conjectures that the resulting pressure originated the cause that led to the stoppage. In addition, he recalls that a similar failure alarm has occurred before.

The serviceman performs a search via the operative events screen to find events by the criteria "simultaneous start in the same direction and emergency stop during travel". In the recorded history he finds a couple of cases where the same problem has appeared, and he is able to conclude with a high degree of probability that the problem is elevator group behavior that permits elevator travel producing a pressure wave. The serviceman reports the cause of the failure further in order that the condition leading to failure can be prevented in the future e.g. via group control.

The invention has been described above by the aid of some of its embodiments. However, the presentation is not to be regarded as limiting the sphere of patent protection, but different embodiments of the invention may vary within the limits defined by the following claims.

What is claimed is:

1. A method for presenting elevator functions on a display in a user interface of the elevator, comprising:

observing functions of the elevator continuously;

registering at least changes occurring in the functions of the elevator and the corresponding times at which the changes occur;

registering elevator traffic events, data relating to the events and the corresponding times at which the traffic events occur;

storing in a memory the changes and traffic events and corresponding times at which the changes and traffic events occur;

selecting a starting event from the traffic events stored in the memory; and displaying on a display device in the user interface a graphic playback of at least the traffic events that followed the starting event.

2. The method as defined in claim 1, wherein the starting event is selected on the basis of time, event type or a bookmark set for the event.

3. The method as defined in claimed 2, further comprising:

saving the bookmark in memory using a bookmark setting function.

4. The method as defined in claim 1, further comprising:

highlighting events relating to a malfunction on the display.

5. The method as defined in claim 1, wherein selecting the starting events is based on a malfunction.

6. The method as defined in claim 1, further comprising:

presenting special properties and operational status of each elevator on the display in a graphic form or as text.

7. The method as defined in claim 1, wherein the starting event is selected on the basis of an operative event and the playback display presents graphically at least the essential traffic events.

8. The method as defined in claim 1, wherein changes occurring in the function of the elevator include disturbances in the operation of the elevator and changes in operational status.

9. The method as defined in claim 1, further comprising:

displaying on a display device in the user interface a graphic playback of at least the changes occuring in elevator operation and traffic events following said starting event.

10. An apparatus for monitoring the traffic events of an elevator and displaying error conditions, said apparatus comprising:

a system observing the functions of the elevator and registering at least changes occurring in the functions, a memory storing events and their times of occurrence associated with the elevator, an interface reading the stored events from the memory, a display presenting the data, a selector selecting a starting event, said interface reading the events stored in the memory following the starting event; and a display presenting traffic events in a graphic form.

11. Apparatus as defined in claim 10, further comprising a device allowing desired events to be highlighted.

12. Apparatus as defined in claim 10, wherein the starting event is permitted to be selected on the basis of operative events and said display permits traffic events to be reproduced graphically on the display.

* * * * *